(12) United States Patent
Iwami

(10) Patent No.: US 12,567,588 B2
(45) Date of Patent: Mar. 3, 2026

(54) NONAQUEOUS ELECTROLYTE SECONDARY BATTERY AND METHOD FOR PRODUCING NONAQUEOUS ELECTROLYTE SECONDARY BATTERY

(71) Applicant: SANYO Electric Co., Ltd., Osaka (JP)

(72) Inventor: Yasunobu Iwami, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 592 days.

(21) Appl. No.: 17/927,252

(22) PCT Filed: May 12, 2021

(86) PCT No.: PCT/JP2021/017971
§ 371 (c)(1),
(2) Date: Nov. 22, 2022

(87) PCT Pub. No.: WO2021/241214
PCT Pub. Date: Dec. 2, 2021

(65) Prior Publication Data
US 2023/0207827 A1 Jun. 29, 2023

(30) Foreign Application Priority Data

May 28, 2020 (JP) ................................. 2020-093111

(51) Int. Cl.
*H01M 4/62* (2006.01)
*H01M 4/02* (2006.01)
(Continued)

(52) U.S. Cl.
CPC ......... *H01M 4/628* (2013.01); *H01M 4/0404* (2013.01); *H01M 4/139* (2013.01); *H01M 10/058* (2013.01); *H01M 2004/027* (2013.01)

(58) Field of Classification Search
CPC .... H01M 4/628; H01M 4/0404; H01M 4/139; H01M 10/058; H01M 2004/027;
(Continued)

(56) References Cited

U.S. PATENT DOCUMENTS

2014/0335409 A1* 11/2014 Wang .................. H01M 4/0404
429/231.9
2020/0075958 A1* 3/2020 Uchida ............... H01M 4/1393

FOREIGN PATENT DOCUMENTS

CN 107785545 A 3/2018
CN 108258249 A 7/2018
(Continued)

OTHER PUBLICATIONS

International Search Report dated Jul. 27, 2021, issued in counterpart Application No. PCT/JP2021/017971, with English translation. (5 pages).
(Continued)

*Primary Examiner* — Daniel S Gatewood
(74) *Attorney, Agent, or Firm* — WHDA, LLP

(57) ABSTRACT

The purpose of the present disclosure is to provide a nonaqueous electrolyte secondary battery that has excellent cycle characteristics. A nonaqueous electrolyte secondary battery according to one embodiment of the present disclosure is provided with: an electrode body that comprises a positive electrode, a negative electrode and a separator; and a nonaqueous electrolyte. A mixture layer of the negative electrode contains a negative electrode active material, at least either one of carboxymethyl cellulose or a salt thereof, and at least either one of sorbic acid or a salt thereof; and the content of the sorbic acid and/or a salt thereof is 1,500 ppm or less relative to the mass of the mixture layer.

4 Claims, 2 Drawing Sheets

(51) Int. Cl.

| | | |
|---|---|---|
| *H01M 4/04* | (2006.01) |
| *H01M 4/139* | (2010.01) |
| *H01M 10/058* | (2010.01) |

(58) Field of Classification Search
CPC ........ H01M 4/04; H01M 4/133; H01M 4/366; H01M 4/622; H01M 10/052; H01M 4/62; H01M 4/13; H01M 10/0525; Y02E 60/10; Y02P 70/50
See application file for complete search history.

(56) References Cited

FOREIGN PATENT DOCUMENTS

| | | | |
|---|---|---|---|
| JP | 4-342966 A | | 11/1992 |
| JP | 2010-80297 A | | 4/2010 |
| JP | 2011192539 A | * | 9/2011 |
| JP | 2013-211246 A | | 10/2013 |
| JP | 2014-135154 A | | 7/2014 |
| JP | 2020-35682 A | | 3/2020 |
| WO | 2012/026462 A1 | | 3/2012 |

OTHER PUBLICATIONS

Written Opinion dated Jul. 27, 2021, issued in counterpart Application No. PCT/JP2021/017971. (3 pages).

Office Action dated Mar. 17, 2025, issued in counterpart CN Application No. 202180037343.3, with English translation. (13 pages).

Sara Sayanjali et al., "Evaluation of antimicrobial and physical properties of edible film based on carboxymethyl cellulose containing potassium sorbate on some mycotoxigenic *Aspergillus* species in fresh pistachios", LWT—Food Science and Technology, vol. No. 44, Issue No. 4, pp. 1133-1138, 2011, Cited in CN Office Action dated Mar. 17, 2025. (6 pages).

* cited by examiner

NONAQUEOUS ELECTROLYTE SECONDARY BATTERY AND METHOD FOR PRODUCING NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/017971 filed on May 12, 2021 which claims the benefit of priorities under 35 U.S.C. § 119 (a) of Japanese Patent Application No. 2020-093111 filed in Japan on May 28, 2020, the contents of which are incorporated herein by reference.

TECHNICAL FIELD

The present disclosure generally relates to a non-aqueous electrolyte secondary battery and a method of manufacturing a non-aqueous electrolyte secondary battery.

BACKGROUND ART

A negative electrode of a non-aqueous electrolyte secondary battery is commonly manufactured by coating a surface of a negative electrode core with a negative electrode mixture slurry including a negative electrode active material and a binder in a dispersion medium, and drying and compressing the coating (for example, see Patent Literature 1). In a negative electrode mixture slurry including water as the dispersion medium, at least one of carboxymethylcellulose and a salt thereof (hereinafter, generically referred to as "CMC compound") is conventionally used as a thickener.

Patent Literatures 2 and 3 propose that addition of a preservative in the slurry to inhibit deterioration of quality of the binder in the negative electrode mixture slurry due to microorganisms. Patent Literatures 2 and 3 disclose an isothiazoline compound as the preservative.

CITATION LIST

Patent Literature

PATENT LITERATURE 1: Japanese Unexamined Patent Application Publication No. Hei 4-342966
PATENT LITERATURE 2: International Publication No. 2012/026462
PATENT LITERATURE 3: Japanese Unexamined Patent Application Publication No. 2013-211246

SUMMARY

Technical Problem

In a non-aqueous electrolyte secondary battery, inhibition of lowering a capacity with charge and discharge to improve cycle characteristics is an important subject. Investigation by the present inventor have found that an additive component in a negative electrode mixture layer significantly affects the cycle characteristics.

Solution to Problem

A non-aqueous electrolyte secondary battery of an aspect of the present disclosure is a non-aqueous electrolyte secondary battery comprising: an electrode assembly including a positive electrode, a negative electrode, and a separator; and a non-aqueous electrolyte, wherein the negative electrode has: a negative electrode core; and a negative electrode mixture layer formed on at least one surface of the negative electrode core, the negative electrode mixture layer includes: a negative electrode active material; at least one of carboxymethylcellulose and a salt thereof; and at least one of sorbic acid and a salt thereof, and a content of the at least one of sorbic acid and a salt thereof is 1500 ppm or less based on a mass of the negative electrode mixture layer.

A method of manufacturing a non-aqueous electrolyte secondary battery of an aspect of the present disclosure is a method of manufacturing a non-aqueous electrolyte secondary battery comprising: an electrode assembly including a positive electrode, a negative electrode, and a separator; and a non-aqueous electrolyte, wherein a step of manufacturing the negative electrode includes the steps of: preparing a negative electrode mixture slurry including: a negative electrode active material; at least one of carboxymethylcellulose and a salt thereof; at least one of sorbic acid and a salt thereof; and water; and coating at least one surface of a negative electrode core with the negative electrode mixture slurry, and drying and compressing the coating to form a negative electrode mixture layer.

Advantageous Effect of Invention

According to an aspect of the present disclosure, a non-aqueous electrolyte secondary battery having excellent cycle characteristics may be provided.

DESCRIPTION OF EMBODIMENTS

Investigation by the present inventor has found that adding a predetermined amount of at least one of sorbic acid and a salt thereof into a negative electrode mixture layer including a CMC compound specifically improves cycle characteristics of a non-aqueous electrolyte secondary battery. The at least one of sorbic acid and a salt thereof is added into a negative electrode mixture slurry including the CMC compound to be included in the negative electrode mixture layer at an amount of 1500 ppm or less. If the addition amount is more than 1500 ppm, the cycle characteristics are rather deteriorated. The sorbic acid or a salt thereof added at a concentration of 1500 ppm or less improves adhesiveness between the negative electrode mixture layer and the negative electrode core, which is presumed to be a main reason of the improvement in the cycle characteristics. It is considered that a carboxyl group in sorbic acid interacts with CMC to strengthen the bond between the polymers.

In addition, since the negative electrode mixture slurry including the CMC compound decreases a viscosity over time, the slurry has a problem of stability during application. It is considered that the viscosity decrease of the slurry is caused by cleavage of a molecular chain of the CMC compound due to an enzyme produced by bacteria included in water. Sorbic acid and a salt thereof are considered to have inhibition effect of growth of the bacteria by penetration inside the bacteria. Thus, adding sorbic acid or a salt thereof into the negative electrode mixture slurry inhibits the decomposition of the CMC compound to inhibit the viscosity decrease of the slurry and to improve the applicability.

The inhibition of the viscosity decrease of the negative electrode mixture slurry to achieve the good applicability contributes to, for example, improvement in adhesiveness between the negative electrode mixture layer and the negative electrode core to improve the cycle characteristics of the battery. In particular, when sorbic acid or a salt thereof is added into the slurry so that the concentration in the negative electrode mixture layer is 100 ppm or more and 1000 ppm or less, the improving effect of the cycle characteristics is remarkable.

Hereinafter, an example of an embodiment of the present disclosure will be described in detail with reference to the drawings, but the present disclosure is not limited to embodiments described below. Hereinafter, a non-aqueous electrolyte secondary battery 10, which is a laminate battery comprising an exterior 11 constituted with laminated sheets 11a and 11b, will be exemplified as the non-aqueous electrolyte secondary battery. It is to be noted that the non-aqueous electrolyte secondary battery according to the present disclosure may be a cylindrical battery comprising a cylindrical battery case, a rectangular battery comprising a rectangular battery case, and the like, and the form of the battery is not particularly limited.

Figure 1:
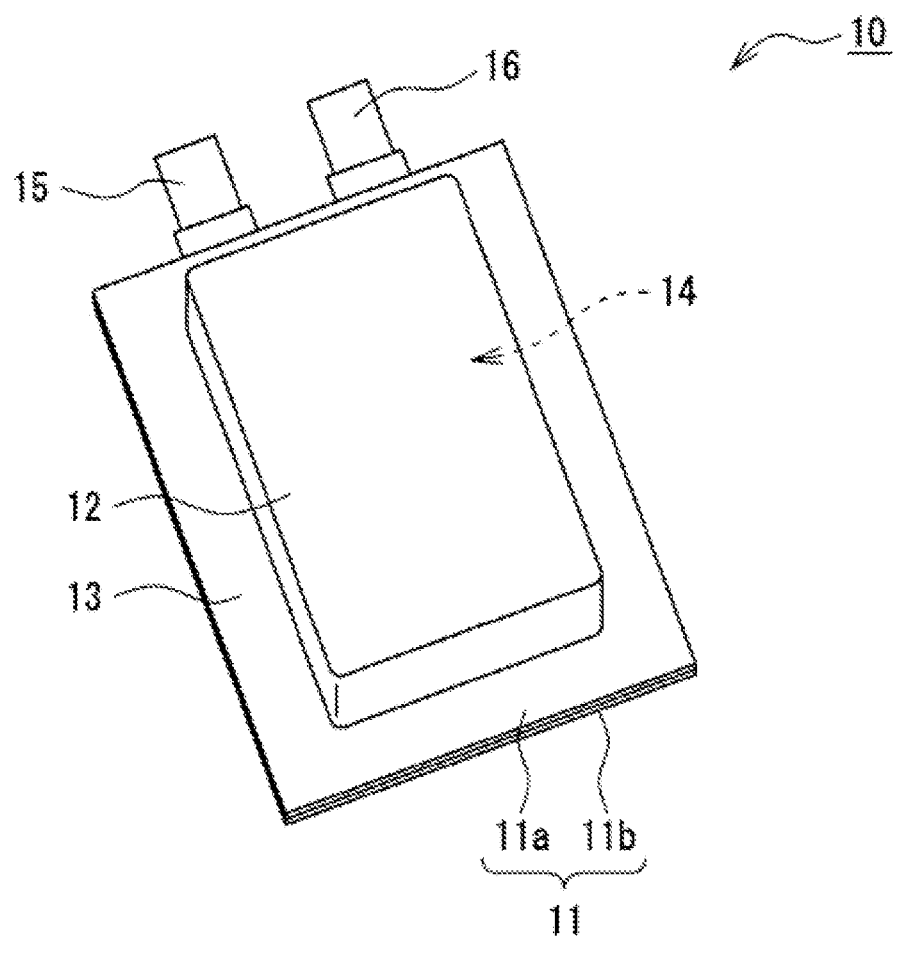
FIG. 1 is a perspective view of a non-aqueous electrolyte secondary battery of an example of an embodiment.

FIG. 1 is a perspective view of the non-aqueous electrolyte secondary battery 10 of an example of an embodiment. The non-aqueous electrolyte secondary battery 10 comprises an electrode assembly 14 and a non-aqueous electrolyte, and these are housed in a housing part 12 of an exterior 11. For the laminated sheets 11a and 11b, a sheet in which a metal layer and a resin layer are stacked is used. The laminated sheets 11a and 11b have, for example, two resin layers sandwiching a metal layer, and one of the resin layers is composed of a resin that can be subjected to thermocompression. Examples of the metal layer include an aluminum layer.

The exterior 11 has, for example, a plane-viewed substantially rectangular shape. A sealed part 13, which is formed on the exterior 11 by bonding the laminated sheets 11a and 11b each other, seals the housing part 12 housing the electrode assembly 14. The sealed part 13 is formed along an edge of the exterior 11 in a frame shape with substantially same width. A part surrounded by the sealed part 13 and having the plane-viewed substantially rectangular shape is the housing part 12. The housing part 12 is provided by forming a cavity that can house the electrode assembly 14 on at least one of the laminated sheets 11a and 11b. In the present embodiment, this cavity is formed on the laminated sheet 11a.

The non-aqueous electrolyte secondary battery 10 comprises a pair of electrode leads (a positive electrode lead 15 and a negative electrode lead 16) connected to the electrode assembly 14. Each electrode lead is withdrawn from inside to outside of the exterior 11. In the example illustrated in FIG. 1, each electrode lead is withdrawn through the same edge side of the exterior 11 in substantially parallel each other. Both the positive electrode lead 15 and the negative electrode lead 16 are conductive thin plates. For example, the positive electrode lead 15 is composed of a metal mainly composed of aluminum, and the negative electrode lead 16 is composed of a metal mainly composed of copper or nickel.

Figure 2:
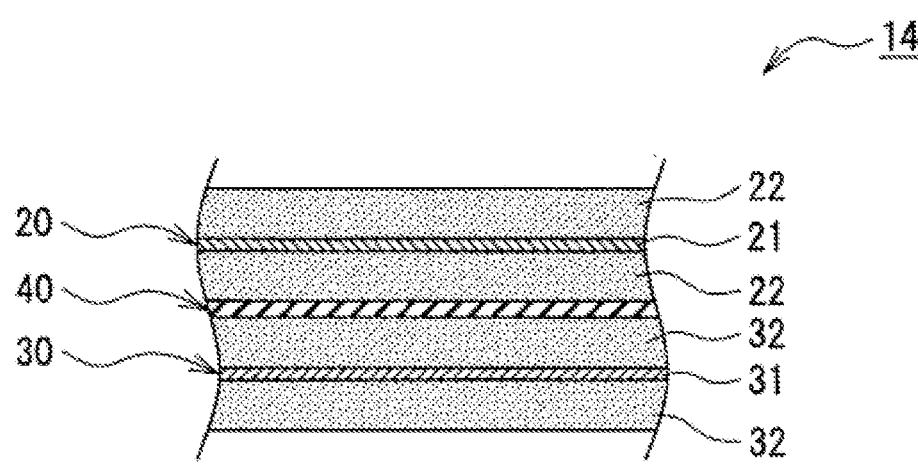
FIG. 2 is a sectional view of an electrode assembly of an example of an embodiment.

FIG. 2 is a sectional view of the electrode assembly 14. As illustrated in FIG. 2, the electrode assembly 14 has a positive electrode 20, a negative electrode 30, and a separator 40 interposed between the positive electrode 20 and the negative electrode 30. The electrode assembly 14 has, for example, a wound structure in which the positive electrode 20 and the negative electrode 30 are wound with the separator 40 interposed therebetween, and is a flat, wound electrode assembly pressed in the radial direction. To prevent precipitation of lithium, the negative electrode 30 is formed to be one size larger than the positive electrode 20. The electrode assembly may be a stacked electrode assembly in which a plurality of the positive electrodes and a plurality of the negative electrodes are alternately stacked one by one with the separator interposed therebetween.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like may be used, for example. The non-aqueous solvent may contain a halogen-substituted solvent in which at least a part of hydrogen atoms in these solvents is substituted with a halogen atom such as fluorine. For example, 0.5 to 5 mass % of fluoroethylene carbonate may be added based on the total mass of the non-aqueous electrolyte. In addition, 1 to 5 mass % of vinylene carbonate may be added based on the total mass of the non-aqueous electrolyte. The non-aqueous electrolyte is not limited to a liquid electrolyte, but may be a solid electrolyte. For the electrolyte salt, a lithium salt such as $LiPF_6$ is used.

Hereinafter, the positive electrode 20, the negative electrode 30, and the separator 40, which constitute the electrode assembly 14, particularly the negative electrode 30, will be described in detail.

[Positive Electrode]

The positive electrode 20 has a positive electrode core 21 and a positive electrode mixture layer 22 formed on at least one surface of the positive electrode core 21. For the positive electrode core 21, a foil of a metal stable within a potential range of the positive electrode 20, such as aluminum and an aluminum alloy, a film in which such a metal is disposed on a surface layer thereof, and the like may be used. The positive electrode mixture layer 22 includes a positive electrode active material, a conductive agent, and a binder, and is preferably formed on both surfaces of the positive electrode core 21. The positive electrode 20 may be manufactured by coating the positive electrode core 21 with a positive electrode mixture slurry including the positive electrode active material, the conductive agent, the binder, and the like, drying and subsequently compressing the coating to form the positive electrode mixture layers 22 on both the surfaces of the positive electrode core 21.

For the positive electrode active material, a lithium-transition metal composite oxide is used. Examples of elements contained in the lithium-transition metal composite oxide include Ni, Co, Mn, Al, B, Mg, Ti, V, Cr, Fe, Cu, Zn, Ga, Sr, Zr, Nb, In, Sn, Ta, and W. A preferable example of the lithium-transition metal composite oxide is a composite oxide containing at least one selected from the group consisting of Ni, Co, Mn, and Al. On a particle surface of the lithium-transition metal composite oxide, inorganic compound particles such as aluminum oxide and a lanthanoid-containing compound may adhere.

Examples of the conductive agent included in the positive electrode mixture layer 22 may include a carbon material such as carbon black, acetylene black. Ketjenblack, and graphite. Examples of the binder included in the positive electrode mixture layer 22 may include a fluororesin such as polytetrafluoroethylene (PTFE) and polyvinylidene fluoride (PVdF), polyacrylonitrile (PAN), a polyimide, an acrylic resin, and a polyolefin. With these resins, carboxymethyl-cellulose (CMC), a salt of CMC, polyethylene oxide (PEO), and the like may be used in combination.

[Negative Electrode]

The negative electrode 30 has a negative electrode core 31 and a negative electrode mixture layer 32 formed on at least one surface of the negative electrode core 31. For the negative electrode core 31, a foil of a metal stable within a potential range of the negative electrode 30, such as copper and a copper alloy, a film in which such a metal is disposed on a surface layer thereof, and the like may be used. The negative electrode mixture layer 32 includes a negative electrode active material, at least one of carboxymethylcel-lulose (CMC) and a salt thereof (CMC compound), and at least one of sorbic acid and a salt thereof, and is preferably formed on both surfaces of the negative electrode core 31. The negative electrode 30 may be manufactured by coating the negative electrode core 31 with a negative electrode mixture slurry including the negative electrode active material and the like, drying and subsequently compressing the coating to form the negative electrode mixture layers 32 on both the surfaces of the negative electrode core 31.

For the negative electrode active material, a carbon-based active material to reversibly occlude and release lithium ions is used. A preferable carbon-based active material is a graphite such as: a natural graphite such as flake graphite, massive graphite, and amorphous graphite; and an artificial graphite such as massive artificial graphite (MAG) and graphitized mesophase-carbon microbead (MCMB). A median diameter (50% particle diameter) on a volumetric basis of the graphite is, for example, 18 to 22 μm. For the negative electrode active material, a Si-based active material containing Si may be used, and the carbon-based active material and the Si-based active material may be used in combination. The Si-based active material has, for example, a structure in which Si particles are dispersed in a Si-containing oxide phase. Examples of the oxide phase include a silicon oxide ($SiO_2$) phase and a composite oxide phase containing Si and a metal element such as Li.

The CMC compound included in the negative electrode mixture layer 32 functions as a thickener of the negative electrode mixture slurry, and also functions as a binder binding between particles of the negative electrode active material and between the negative electrode active material and the negative electrode core 31. The negative electrode mixture layer 32 preferably includes a salt of CMC. The salt of CMC is, for example, a sodium salt or an ammonium salt. The salt of CMC is typically a partially neutralized salt in which a part of carboxyl groups is neutralized. The negative electrode mixture layer 32 (negative electrode mixture slurry) may include a mixture of CMC and the salt of CMC, and may include CMC or the salt of CMC alone. A weight-average molecular weight of the CMC compound is, for example, 200 thousands to 500 thousands.

The negative electrode mixture layer 32 preferably includes a rubber binder as a binder in addition to the CMC compound. Each of contents of the CMC compound and the rubber binder is preferably 0.1 to 5 mass %, and more preferably 0.5 to 3 mass % based on the total mass of the negative electrode mixture layer 32. A preferable rubber binder is styrene-butadiene rubber (SBR) or a modified rubber thereof. The modified rubber of SBR may include at least one selected from the group consisting of an acryloni-trile unit, an acrylate unit, an acrylic acid unit, a methacry-late unit, and a methacrylic acid unit. The SBR and the modified rubber thereof are typically supplied as a dispersion form with water as a dispersion medium.

As described above, sorbic acid or a salt thereof (herein-after, generically referred to as "sorbic acid compound") inhibits the viscosity decrease of the negative electrode mixture slurry to maintain the good applicability of the slurry and improve adhesiveness between the negative elec-trode core 31 and the negative electrode mixture layer 32, resulting in improvement in the cycle characteristics of the battery. Sorbic acid is an unsaturated fatty acid represented by the molecular formula $C_6H_8O_2$. The sorbic acid com-pound, which is dissolved or dispersed in water in the negative electrode mixture slurry, is considered to inhibit growth of the bacteria to inhibit decomposition of the CMC compound.

A content of the sorbic acid compound is 1500 ppm or less based on the mass of the negative electrode mixture layer 32. Although even a small addition amount of the sorbic acid compound may exhibit the effect of improving the cycle characteristics compared with a case of adding no sorbic acid compound, if the concentration is more than 1500 ppm, the cycle characteristics are rather deteriorated. The content of the sorbic acid compound may be measured by gas chromatography.

The content of the sorbic acid compound is preferably 100 ppm or more and 1000 ppm or less, more preferably 150 ppm or more and 750 ppm or less, and particularly prefer-ably 200 ppm or more and 500 ppm or less. In this case, the viscosity decrease of the negative electrode mixture slurry may be effectively inhibited, and the stable applicability of the slurry may be easily achieved. The adhesiveness between the negative electrode core 31 and the negative electrode mixture layer 32 is further improved, and the effect of improving the cycle characteristics is remarkable.

The negative electrode mixture layer 32 (negative elec-trode mixture slurry) may include a mixture of sorbic acid and a sorbate salt, and may include sorbic acid or a sorbate salt alone. Preferable examples of the sorbic acid compound include at least one selected from the group consisting of sorbic acid, potassium sorbate, sodium sorbate, and calcium sorbate. Among them, sorbic acid, potassium sorbate, and sodium sorbate are particularly preferable.

The negative electrode 30 is manufactured by, for example, the following two steps:

(1) preparing the negative electrode mixture slurry includ-ing: the negative electrode active material; the at least one of carboxymethylcellulose and a salt thereof (CMC compound); the at least one of sorbic acid and a salt thereof (sorbic acid compound); and water; and (2) coating the surface of the negative electrode core 31 with the negative electrode mixture slurry, and drying and compressing the coating to form the negative electrode mixture layer 32.

A solid-content concentration of the negative electrode mixture slurry is preferably approximately 45 to 55 mass % from the viewpoints of handling, applicability, and the like.

The sorbic acid compound is added at an amount of, for example, 0.1 to 20 mass %, 0.5 to 15 mass %, or 0.6 to 13 mass % based on the mass of the CMC compound. The sorbic acid compound included in the negative electrode mixture slurry is incorporated in the negative electrode mixture layer 32 together with the CMC compound. Thus, a mass ratio between the CMC compound and the sorbic acid compound in the negative electrode mixture layer 32 is substantially same as that in the negative electrode mixture slurry.

[Separator]

For the separator 40, a porous sheet having an ion permeation property and an insulation property is used.

Specific examples of the porous sheet include a fine porous thin film, a woven fabric, and a nonwoven fabric. As a material for the separator 40, an olefin resin such as polyethylene and polypropylene, cellulose, and the like are preferable. The separator 40 may have any of a single-layered structure and a laminated structure. On a surface of the separator 40, a heat-resistant layer and the like may be formed.

EXAMPLES

Hereinafter, the present disclosure will be further described with Examples, but the present disclosure is not limited to these Examples.

Example 1

[Production of Positive Electrode]

As a positive electrode active material, a lithium-containing metal composite oxide represented by $LiCo_{0.979}Zr_{0.001}Mg_{0.01}Al_{0.01}O_2$ was used. The positive electrode active material, carbon black, and polyvinylidene fluoride (PVdF) were mixed at a solid-content mass ratio of 95:2.5:2.5 to prepare a positive electrode mixture slurry with N-methyl-2-pyrrolidone (NMP) as a dispersion medium. Both surfaces of an elongated positive electrode core made of aluminum foil having a thickness of 15 μm were coated with the positive electrode mixture slurry by a doctor blade method, the coating was dried, and then the coating was compressed with a roller to form positive electrode mixture layers on both the surfaces of the positive electrode core. The positive electrode core on which the positive electrode mixture layers were formed was cut to a predetermined electrode size to produce a positive electrode.

[Production of Negative Electrode]

Used as negative electrode active materials were graphite having a median diameter on a volumetric basis of 22 μm and a Si-containing compound (SiO) in which Si particles were dispersed in an oxide phase containing Si. The graphite and SiO were mixed at a mass ratio of 95:5. The SiO was obtained by heat-treating a mixture of metal silicon and silicon dioxide under a reduced pressure, forming a carbon coating on the particle surface with a CVD method by heating to approximately 1000° C., and then crushing and classifying the mixture.

The negative electrode active materials, a sodium salt of CMC (CMC-Na), and SBR were mixed at a solid-content mass ratio of 97:1.5:1.0, and sorbic acid was further added so that the concentration was 50 ppm based on the solid content (the negative electrode active material, CMC-Na, and SBR) to prepare a negative electrode mixture slurry with water (ion-exchanged water) as a dispersion medium. Both surfaces of an elongated negative electrode core made of copper foil were coated with the negative electrode mixture slurry by a doctor blade method, the coating was dried, and then the coating was compressed with a roller to form negative electrode mixture layers on both the surfaces of the negative electrode core. The negative electrode core on which the negative electrode mixture layers were formed was cut to a predetermined electrode size to produce a negative electrode.

[Preparation of Non-Aqueous Electrolyte Liquid]

Into a mixed solvent in which ethylene carbonate (EC) and methyl ethyl carbonate (MEC) were mixed at a volume ratio of 3:7 (at 25° C., 1 atm), $LiPF_6$ was added so that the concentration was 1 mol/L. Vinylene carbonate was further added so that the concentration was 2 mass % to prepare a non-aqueous electrolyte liquid.

[Production of Battery]

A positive electrode lead and a negative electrode lead were attached to the above positive electrode and the above negative electrode, respectively, and the positive electrode and the negative electrode were wound with a separator composed of a polyethylene porous film interposed therebetween. A tape made of polypropylene was attached to the outermost circumference surface of the wound product, and then the wound product was pressed in the radial direction to produce a flat, wound electrode assembly. Under an argon atmosphere, the electrode assembly and the above non-aqueous electrolyte were housed in a cup-shaped housing part of an exterior constituted with laminated sheets having five-layered structure of polypropylene layer/adhesive layer/aluminum alloy layer/adhesive layer/polypropylene layer. Thereafter, a pressure inside the exterior was reduced to immerse the electrode assembly in the electrolyte liquid, and an opening of the exterior was sealed to produce a non-aqueous electrolyte secondary battery with 62 mm in height, 35 mm in width, and 3.6 mm in thickness.

Example 2

A non-aqueous electrolyte secondary battery was produced in the same manner as in Example 1 except that the addition amount of sorbic acid was changed to 100 ppm based on the solid content in the preparation of the negative electrode mixture slurry.

Example 3

A non-aqueous electrolyte secondary battery was produced in the same manner as in Example 1 except that the addition amount of sorbic acid was changed to 200 ppm based on the solid content in the preparation of the negative electrode mixture slurry.

Example 4

A non-aqueous electrolyte secondary battery was produced in the same manner as in Example 1 except that the addition amount of sorbic acid was changed to 500 ppm based on the solid content in the preparation of the negative electrode mixture slurry.

Example 5

A non-aqueous electrolyte secondary battery was produced in the same manner as in Example 1 except that the addition amount of sorbic acid was changed to 1000 ppm based on the solid content in the preparation of the negative electrode mixture slurry.

Example 6

A non-aqueous electrolyte secondary battery was produced in the same manner as in Example 3 except that the sorbic acid was changed to potassium sorbate in the preparation of the negative electrode mixture slurry.

Example 7

A non-aqueous electrolyte secondary battery was produced in the same manner as in Example 3 except that the sorbic acid was changed to sodium sorbate in the preparation of the negative electrode mixture slurry.

Example 8

A non-aqueous electrolyte secondary battery was produced in the same manner as in Example 3 except that the sorbic acid was changed to calcium sorbate in the preparation of the negative electrode mixture slurry.

Comparative Example 1

A non-aqueous electrolyte secondary battery was produced in the same manner as in Example 1 except that no sorbic acid was added in the preparation of the negative electrode mixture slurry.

Comparative Example 2

A non-aqueous electrolyte secondary battery was produced in the same manner as in Example 1 except that the addition amount of sorbic acid was changed to 2000 ppm based on the solid content in the preparation of the negative electrode mixture slurry.

Comparative Example 3

A non-aqueous electrolyte secondary battery was produced in the same manner as in Example 3 except that the sorbic acid was changed to 1,2-benzoisothiazolin-3-one in the preparation of the negative electrode mixture slurry.

[Viscosity Measurement of Negative Electrode Mixture Slurry]

Of each negative electrode mixture slurry of Examples and Comparative Examples, a viscosity immediately after the preparation and a viscosity 48 hours after the preparation were measured by using a B-type viscosimeter (TVC10, manufactured by Toki Sangyo Co., Ltd) at 25° C., and a ratio of the viscosity 48 hours after the preparation to the viscosity immediately after the preparation (viscosity maintenance rate) was determined with the following formula. Table 1 shows the viscosity maintenance rate of each negative electrode mixture slurry.

Viscosity Maintenance Rate after 48 hours=(Viscosity 48 hours after Preparation/Viscosity immediately after Preparation)×100

[Evaluation of Adhesiveness (Measurement of Peeling Strength)]

Of each negative electrode of Examples and Comparative Examples (a density of the negative electrode mixture layer: 1.6 g/mL), adhesiveness of the negative electrode mixture layer against the negative electrode core was evaluated with a method described in Japanese Unexamined Patent Application Publication No. 2005-251481.

(1) Prepared were an acrylic plate (3.0×12 cm), a double-sided tape (2×9 mm, NICETACK NW-20, manufactured by Nichiban Co., Ltd.), and an electrode plate for evaluation (2.5×16 cm) in which each negative electrode was cut to a predetermined size.

(2) The double-sided tape was attached onto the acrylic plate from the end with 8.5 cm in the longitudinal direction (remained in 0.5 cm).

(3) The electrode plate for evaluation was attached onto the double-sided tape attached onto the acrylic plate, and a part in the electrode plate for evaluation where the double-sided tape was not attached was withdrawn with a tensile tester at a rate of 100 mm/min until the negative electrode mixture layer was peeled to measure a peeling strength (adhesive strength) of the negative electrode mixture layer. Table 1 shows the measurement results of the peeling strength.

[Measurement of Capacity Maintenance Rate]

At 25° C., each battery of Examples and Comparative Examples was charged at a constant current of 800 mA until a battery voltage reached 4.2 V, and then charged at a constant voltage of 4.2 V until a current reached a termination current of 40 mA. Thereafter, the battery was discharged at a constant current of 800 mA until the battery voltage reached 2.75 V. This charge-discharge cycle was repeated 150 times, and a ratio of a discharge capacity at the 150th cycle to a discharge capacity at the 1st cycle (capacity maintenance rate) was determined. Table 1 shows the capacity maintenance rate of each battery.

TABLE 1

| | Slurry additive | Content (ppm) | Peeling strength (N/cm) | Capacity maintenance rate (%) | Viscosity maintenance rate (%) |
|---|---|---|---|---|---|
| Example 1 | Sorbic acid | 50 | 105 | 79.5 | 25 |
| Example 2 | Sorbic acid | 100 | 113 | 83.5 | 70 |
| Example 3 | Sorbic acid | 200 | 117 | 85.8 | 75 |
| Example 4 | Sorbic acid | 500 | 115 | 85.3 | 80 |
| Example 5 | Sorbic acid | 1000 | 108 | 83.6 | 85 |
| Example 6 | Potassium sorbate | 200 | 117 | 85.8 | 98 |
| Example 7 | Sodium sorbate | 200 | 117 | 85.8 | 77 |
| Example 8 | Calcium sorbate | 200 | 110 | 82.1 | 72 |
| Comparative Example 1 | — | 0 | 99 | 76.8 | 27 |
| Comparative Example 2 | Sorbic acid | 2000 | 89 | 72.3 | 101 |
| Comparative Example 3 | 1,2-Dibenzoisotliiazolin-3-one | 200 | 93 | 74.8 | 80 |

As understood from the results in Table 1, any of the batteries of Examples have a higher capacity maintenance rate after the charge-discharge cycle than the batteries of Comparative Examples, and have excellent cycle characteristics. The negative electrodes of Examples have a higher peeling strength of the negative electrode mixture layer than the batteries of Comparative Examples, and have high adhesiveness between the negative electrode core and the negative electrode mixture layer. That is, the sorbic acid or the salt thereof improves the adhesiveness between the negative electrode core and the negative electrode mixture layer, which is considered to be a main reason of the improvement in the cycle characteristics. Meanwhile, when the sorbic acid compound is not added, such as in Comparative Examples 1 and 3, and when the sorbic acid concentration is more than 1500 ppm, such as in Comparative Example 2, the peeling strength was lowered to deteriorate the cycle characteristics.

In particular, when the addition amount of the sorbic acid compound is 100 ppm or more and 1000 ppm or less (Examples 2 to 8), the viscosity decrease of the slurry is inhibited for improving the applicability to improve the adhesiveness between the negative electrode core and the negative electrode mixture layer, resulting in further remarkable improving effect of the cycle characteristics.

REFERENCE SIGNS LIST

10 Non-aqueous electrolyte secondary battery, 11 Exterior, 11a, 11b Laminated sheet, 12 Housing part, 13 Sealed part, 14 Electrode assembly, 15 Positive electrode lead, 16 Negative electrode lead, 20 Positive electrode, 21 Positive electrode core, 22 Positive electrode mixture layer, 30 Negative electrode, 31 Negative electrode core, 32 Negative electrode mixture layer, 40 Separator

The invention claimed is:

1. A non-aqueous electrolyte secondary battery, comprising:

an electrode assembly including a positive electrode, a negative electrode, and a separator; and a non-aqueous electrolyte, wherein the negative electrode has: a negative electrode core; and a negative electrode mixture layer formed on at least one surface of the negative electrode core, the negative electrode mixture layer includes: a negative electrode active material; at least one of carboxymethylcellulose and a salt thereof; and at least one of sorbic acid and a salt thereof, and a content of the at least one of sorbic acid and a salt thereof is 50 ppm or more and 1500 ppm or less based on a mass of the negative electrode mixture layer.

2. The non-aqueous electrolyte secondary battery according to claim 1, wherein the content of the at least one of sorbic acid and a salt thereof is 100 ppm or more and 1000 ppm or less based on the mass of the negative electrode mixture layer.

3. The non-aqueous electrolyte secondary battery according to claim 1, wherein the negative electrode mixture layer includes at least one selected from the group consisting of sorbic acid, potassium sorbate, sodium sorbate, and calcium sorbate.

4. A method of manufacturing a non-aqueous electrolyte secondary battery comprising: an electrode assembly including a positive electrode, a negative electrode, and a separator; and a non-aqueous electrolyte, wherein a step of manufacturing the negative electrode includes the steps of:

preparing a negative electrode mixture slurry including: a negative electrode active material; at least one of carboxymethylcellulose and a salt thereof; at least one of sorbic acid and a salt thereof; and water, wherein the at least one of sorbic acid and a salt thereof is added to the slurry to a concentration of 50 ppm or more 1500 ppm or less based on a solid content of the negative electrode mixture slurry; and coating at least one surface of a negative electrode core with the negative electrode mixture slurry, and drying and compressing the coating to form a negative electrode mixture layer.

\* \* \* \* \*